United States Patent [19]

Muehlbach et al.

[11] Patent Number: 5,153,266

[45] Date of Patent: Oct. 6, 1992

[54] THERMOPLASTIC MOLDING MATERIALS BASED ON TOUGHENED POLYAMIDE AND FUNCTIONALIZED POLYPHENYLENE ETHER

[75] Inventors: Klaus Muehlbach, Heppenheim; Graham E. McKee, Weinheim; Ehrenfried Baumgartner, Roedersheim-Gronau, all of Fed. Rep. of Germany

[73] Assignee: BASF Aktiengesellschaft, Ludwigshafen, Fed. Rep. of Germany

[21] Appl. No.: 482,817

[22] Filed: Feb. 21, 1990

[30] Foreign Application Priority Data

Mar. 15, 1989 [DE] Fed. Rep. of Germany ....... 3908408

[51] Int. Cl.$^5$ .................. C08L 61/04; C08L 71/12
[52] U.S. Cl. ........................... 525/66; 525/68; 525/92; 525/397; 525/905
[58] Field of Search .............. 525/66, 397, 905, 68

[56] References Cited

U.S. PATENT DOCUMENTS 4,315,086  2/1982  Ueno .
4,943,399  7/1990  Taubitz .
4,957,965  9/1990  Taubitz .

FOREIGN PATENT DOCUMENTS 0024120  2/1981  European Pat. Off. .
0236593  9/1987  European Pat. Off. .
0253123  1/1988  European Pat. Off. .
0276768  8/1988  European Pat. Off. .
0302485  2/1989  European Pat. Off. .
3443154  5/1986  Fed. Rep. of Germany .
3644208  7/1987  Fed. Rep. of Germany .
WO87/00540  1/1987  PCT Int'l Appl. .

Primary Examiner—Jacob Ziegler
Attorney, Agent, or Firm—Oblon, Spivak, McClelland, Maier & Neustadt

[57] ABSTRACT

Thermoplastic molding materials which are free of cyanuric acid or cyanuric acid derivatives contain as essential components, (A) from 5 to 95% by weight of a toughened polyamide of
   a1) from 70 to 98% by weight, based on (A), of a polyamide and
   a2) from 2 to 30% by weight, based on (A), of an emulsion polymer whose particles do not have a hard outer shell, and
(B) from 5 to 95% by weight of a functionalized polyphenylene ether.

5 Claims, No Drawings

THERMOPLASTIC MOLDING MATERIALS BASED ON TOUGHENED POLYAMIDE AND FUNCTIONALIZED POLYPHENYLENE ETHER

The present invention relates to thermoplastic molding materials which are free of cyanuric acid or cyanuric acid derivatives and contain, as essential components, (A) from 5 to 95% by weight of a toughened polyamide of
  a1) from 70 to 98% by weight, based on (A), of a polyamide and
  a2) from 2 to 30% by weight, based on (A), of an emulsion polymer whose particles do not have a hard outer shell, and (B) from 5 to 95% by weight of a functionalized poly-phenylene ether.

Blends of polyamides with polyphenylene ethers and impact modifiers are known per se, for example from DE-A 3 443 154. However, the flow of these molding materials is unsatisfactory. Furthermore, it has been found that the impact strength decreases substantially on repeated compounding.

Moreover, EP-A 236 593 and WO-A 87/00540 disclose molding materials of a polyphenylene ether which may be functionalized, a polyamide and an impact modifier. Impact modifiers consist of particles having a core/shell structure with an elastomeric core and a hard, non-elastomeric shell. However, these molding materials have the disadvantage that the processibility and the impact strength are unsatisfactory.

DE-A 3 732 907 describes molding materials of polyamide, which contains cyanuric acid or a cyanuric acid derivative, and a modified polyphenylene ether.

It is an object of the present invention to provide thermoplastic molding materials which are based on functionalized polyphenylene ether and toughened polyamide and have a balanced profile of mechanical and thermal properties while avoiding the abovementioned disadvantages. We have found that this object is achieved by the molding materials defined at the outset. We have furthermore found preferred embodiments as claimed in the subclaims and a preparation process, and that the molding materials can be used for the production of moldings.

The novel molding materials contain, as essential components, from 5 to 95, preferably from 40 to 70%, by weight of a toughened polyamide (A) and from 5 to 95, preferably from 30 to 60%, by weight of a functionalized polyphenylene ether (B), the percentages by weight being based in each case on the sum of components (A) and (B).

(A) consists of from 70 to 98, preferably from 85 to 97, in particular from 85 to 95%, by weight, based on (A), of a polyamide a1) and from 2 to 30, preferably from 3 to 15, in particular from 5 to 15%, by weight, based on (A), of an emulsion polymer a2).

Linear polyamides, which usually have a relative viscosity of from 2.2 to 5.0, preferably from 2.5 to 4, measured in 1% strength by weight solution in 96% strength by weight sulfuric acid at 23° C., are suitable as a1). Preferred polyamides are those derived from lactams having 7 to 13 ring members, such as polycaprolactam, polycapryllactam or polylaurolactam, and polyamides obtained by reacting dicarboxylic acids with diamines. Examples of these are nylon 6,6, nylon 6,12 and the nylon 4,6 described in EP-A 39 524. Polyamides which are obtained by reacting dicarboxylic acids with diisocyanates are also suitable.

Examples of suitable dicarboxylic acids are alkanedicarboxylic acids of 5 to 12, in particular 6 to 10, carbon atoms, as well as terephthalic acid and isophthalic acid and any mixtures of these acids.

Examples of diamines are alkanediamines of 4 to 12, in particular 4 to 8, carbon atoms, and m-xylylenediamine, p-xylylenediamine, their hydrogenated derivatives, bis-(4-aminophenyl)-methane, bis-(4-aminocyclohexyl)-methane and 2,2-bis-(4-aminophenyl)-propane and mixtures thereof.

Nylon 6 (polycaprolactam), nylon 6,6 (polyhexamethyleneadipamide) and their copolymers and polyamides obtained from hexamethylenediamine and isophthalic acid and terephthalic acid have become particularly important industrially.

Further examples are partially aromatic copolyamides based on caprolactam, adipic acid, hexamethylenediamine, terephthalic acid and/or isophthalic acid. Among these, copolyamides having repeating units derived from caprolactam and/or adipic acid/hexamethylenediamine on the one hand and terephthalic acid and hexamethylenediamine on the other hand may be mentioned. A particularly suitable preparation process for such products is described in, for example, EP-A 129 195 and EP-A 129 196.

It is also possible, and sometimes advantageous, to use mixtures of the stated polyamides.

The known emulsion polymers a2) consist of particles which are prepared in a one-stage, two-stage or multistage emulsion polymerization, as described in, for example, Houben-Weyl, Methoden der organischen Chemie, Vol. 14 (1961), pages 133–406 and Vol. E20 (1987), pages 218–313, and Encyclopedia of Polymer Science and Technology, Vol. 5 (1966), pages 801–859. The emulsifiers, catalysts and any regulators and buffer systems which may be used are known per se. The median diameter of the particles of the emulsion polymers is usually from 0.05 to 2 µm, in particular from 0.08 to 0.7 µm. The particles of the emulsion polymers may be homogeneous or, preferably, may have a core/shell structure. The structure comprising a core and one or more shells is usually determined in emulsion polymerization by the order in which the individual monomers or monomer mixtures are added. The morphology of the particles, too, is influenced by the order of addition; the core and the shell of the polymer particles or the various shells can be chemically bonded to one another by grafting or coupled to one another by interpenetrating networks. Emulsion polymers having a core/shell structure are known per se, for example from WO-A 87/00540, U.S. Pat. No.-A 4 034 013 and EP-A 125 483. Preferred emulsion polymers are, very generally, those having a core and one shell, but under certain circumstances emulsion polymers whose particles contain 2 or 3 shells may also be advantageous.

The core and the shell or shells of the emulsion polymer may differ in various parameters, for example in the monomer or monomer mixture, in the crosslinking or in the molecular weight. It has proven advantageous if one or more shells contain a monomer which differs from the monomers in the core. Preferred emulsion polymers a2) are those having a diene core and a shell based on a (meth)acrylate.

The emulsion polymers a2) do not have a hard outer shell. For the purposes of the present invention, a hard shell has a glass transition temperature of more than +20° C. Preferred emulsion polymers a2) possess a core and an outer shell having a glass transition temperature of less than 0° C., in particular less than −10° C. The glass transition temperatures can be determined in a simple manner by polymerizing the monomer or monomer mixture of the core or, alternatively, of the shell without the remaining polymerization stages of the emulsion polymerization and determining the glass transition temperature of the reaction product, for example as described by K.H. Illers and H. Breuer, Kolloidzeitschrift 176 (1961), 110.

The monomers which can be used for synthesizing the elastomeric parts of the emulsion polymer a2) are known per se.

Acrylates, e.g. n-butyl acrylate and 2-ethylhexyl acrylate, the corresponding methacrylates, butadiene and isoprene, and mixtures thereof may be mentioned here merely as typical monomers for the preparation of the elastomer part. These monomers can be copolymerized with minor amounts of further monomers, e.g. styrene, acrylonitrile, vinyl ethers and further acrylates or methacrylates, such as methyl methacrylate, methyl acrylate, ethyl acrylate and propyl acrylate.

In the case of multi-shell polymers, the core or inner shell may also contain hard components, which usually have a glass transition temperature of more than 20° C. These hard components are generally prepared by polymerization of styrene, acrylonitrile, methacrylonitrile, α-methylstyrene, p-methylstyrene, acrylates and methacrylates, such as methyl acrylate, ethyl acrylate and methyl methacrylate, as principal monomers. In addition, smaller amounts of further comonomers may be used here too.

In some cases, it has proven advantageous to use emulsion polymers which have reactive groups, which are preferably in the outer shell. These may promote adhesion between emulsion polymer and polyamide and are usually introduced by polymerization of functionalized monomers. Such groups are, for example, carboxylic ester, carboxamide, carboximide, anhydride, epoxy, carboxyl, latent carboxyl, urethane, urea or amino groups and functional groups which are incorporated by the concomitant use of monomers of the general formula

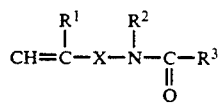

where $R^1$ is hydrogen or $C_1$-$C_4$-alkyl, $R^2$ is hydrogen, $C_1$-$C_8$-alkyl or aryl, in particular phenyl, $R^3$ is hydrogen, $C_1$-$C_{10}$alkyl, $C_6$-$C_{12}$-aryl or -$OR^4$, $R^4$ is $C_1$-$C_8$-alkyl or $C_6$-$C_{12}$-aryl, each of which may be substituted by O— or N— containing groups, X is a chemical bond, $C_1$-$C_{10}$-alkylene, $C_6$-$C_{12}$-arylene or

Y is O—Z— or NH—Z— and Z is $C_1$-$C_{10}$-alkylene or $C_6$-$C_{12}$-arylene.

The graft monomers described in EP-A 208 187 are also suitable for the introduction of reactive groups.

Examples of monomers by means of which the stated reactive groups can be introduced are glycidyl methacrylate, glycidyl acrylate, allyl glycidyl ether, vinyl glycidyl ether, glycidyl itaconate, acrylic acid, methacrylic acid and their metal salts, in particular alkali metal and ammonium salts, maleic acid, fumaric acid, itaconic acid, vinylbenzoic acid, vinylphthalic acid and monoesters of these acids with alcohols ROH, where R is of not more than 29 carbon atoms and is, for example, methyl, ethyl, propyl, isopropyl, n-butyl, isobutyl, hexyl, cyclohexyl, octyl, 2-ethylhexyl, decyl, stearyl, methoxyethyl, ethoxyethyl or hydroxyethyl. Maleic anhydride and metal salts (in particular alkali metal and alkaline earth metal salts) of polymerizable carboxylic acids and esters of acrylic acid or methacrylic acid with tertiary alcohols, e.g. tert-butyl acrylate, have no free carboxyl groups but behave similarly to the free acids and are therefore regarded as monomers having latent carboxyl groups.

Further examples are acrylamide, methacrylamide and substituted esters of acrylic acid or methacrylic acid, such as N-tert-butylaminoethyl methacrylate, N,N-dimethylaminoethyl acrylate, N,N-dimethylaminomethyl acrylate, N,N-diethylaminoethyl acrylate and N-methylvinylurethane.

It is sometimes advantageous to produce the emulsion polymers or the outer shell in inhomogeneous form, for example by not adding the monomers supplying reactive groups until toward the end of the polymerization or polymerization stage. As a result, at least the surface of the polymer particles has reactive groups. From 0.1 to 20, preferably from 0.2 to 10, in particular from 0.3 to 8%, by weight of these monomers in the outer shell of the polymer particles have proven useful.

Particles of the emulsion polymer a2) may be partly or completely crosslinked. For example, the core of the polymer particle may be crosslinked while the outer shell, which preferably contains the polymerized adhesion-promoting comonomers providing functional groups, may be uncrosslinked, or vice versa. Furthermore, the core and the shell may be crosslinked. In the case of a multi-shell structure, crosslinking of the individual shells may be adapted to the requirements by appropriate control of the polymerization stages. Crosslinking monomers are those which contain two or more copolymerizable multiple bonds. Examples are butadiene, penta-1,3-diene, divinylbenzene, diallyl phthalate and dihydrodicyclopentadienyl acrylate, as well as allyl acrylate, allyl methacrylate, diallyl maleate, diallyl fumarate, diallyl itaconate and the corresponding monoesters of the dicarboxylic acids. In general, the amount of these crosslinking agents is not more than 5, preferably from 0.1 to 3% by weight, based on the monomer mixture of the polymerization stage to be crosslinked.

Functionalized polyphenylene ethers B are known per se, for example from WO-A 86/02086, WO-A 87/00540, EP-A 222 246, EP-A 223 116 and EP-A 254 048. They are preferably obtainable by functionalization of polyphenylene ethers b1 or a mixture of b1 with from 0 to 20, preferably from 5 to 20%, by weight, based on the mixture, of a vinylaromatic polymer b2. Functionalization is understood as meaning a reaction of the polyphenylene ether b1, if necessary mixed with b2, with the unsaturated monomers b3.

The polyphenylene ethers b1 are known per se. They are prepared by conventional processes, by oxidative coupling of phenols which are disubstituted in the orthoposition by alkyl (cf. U.S. Pat. Nos. 3,661,848, 3,219,625, 3,378,505, 3,306,874, 3,306,875 and 3,639,656). Examples of suitable polyphenylene ethers are poly-(2,6-diethyl1,4-phenylene) ether, poly-(2-methyl-6-ethyl-1,4phenylene) ether, poly-(2-methyl-6-propyl-1,4-phenylene) ether, poly-(2,6-dipropyl-1,4-phenylene) ether, poly-(2-ethyl-6propyl-1,4-phenylene) ether and copolymers, such as those which contain 2,3,6-trimethylphenol, as well as polymer blends. Poly-(2,6-dimethyl-1,4-phenylene) ether is preferred. The polyphenylene ethers prepared in such a process generally have a relative viscosity of from 0.3 to 0.8 dl/g, measured in 1% strength by weight solution in $CHCl_3$ at 25° C.

The vinylaromatic polymer b2 which may be mixed with the polyphenylene ether b1 is in general compatible with b1.

Examples of such vinylaromatic polymers which are compatible with polyphenylene ethers are described in the monograph by O. Olabisi, Polymer-Polymer Miscibility (1979), pages 224–230 and 245. Vinylaromatic polymers of styrene, chlorostyrene, α-methylstyrene and para-methylstyrene are mentioned here merely as typical examples; comonomers, such as (meth)acrylonitrile or (meth)acrylates, may also be present in the said polymers in minor amounts (preferably not more than 8% by weight). A particularly preferred vinylaromatic polymer is polystyrene. It is of course also possible to use blends of these polymers.

The molecular weight of these conventional polymers is in general from 1,500 to 1,000,000, preferably from 70,000 to 500,000.

The ethylenically unsaturated monomer b3 contains one or more epoxy, amino, carboxyl, anhydride, carboxylic ester, carboxamide or carboximide groups. Preferred monomers b3 are those which contain two C=O groups. Examples are methylmaleic acid, methylmaleic anhydride, itaconic acid, itaconic anhydride, maleic acid, maleic anhydride, butenylsuccinic acid, butenylsuccinic anhydride, tetrahydrophthalic acid, tetrahydrophthalic anhydride, fumaric acid, N-phenylmaleimide, mono- or diesters of the stated acids with $C_1$-$C_{12}$-alcohols, such as methanol or ethanol, the mono- or diamides of the stated acids, which may be substituted at the N atom by alkyl or aryl radicals of not more than 12 carbon atoms. Maleic acid, fumaric acid and maleic anhydride are particularly advantageous.

From 70 to 99.9, preferably from 80 to 97%, by weight of b1, from 0 to 20, preferably from 2 to 15%, by weight of b2 and from 0.1 to 30, preferably from 0.98 to 10%, by weight of b3 are usually used in the functionalization. It may be advantageous to carry out the functionalization in the presence of not more than 5, preferably from 0.02 to 0.09%, by weight of a free radical initiator b4. The stated percentages by weight are based in each case on the sum of the substances b1 to b4 used.

The choice of the free radical initiator depends in the usual way on the reaction temperature. Examples of known free radical initiators are di-(2,4-dichlorobenzoyl) peroxide, tert-butyl peroxide, di-(3,5,5-trimethylhexanol) peroxide, dilauroyl peroxide, didecanoyl peroxide, dipropionyl peroxide, dibenzoyl peroxide, tert-butyl peroxy-2-ethylhexanoate, tert-butyl peroxydiethylacetate, tert-butyl peroxyisobutyrate, 1,1-di-tert-butyl peroxy-3,3,5-trimethylcyclohexane, tert-butyl peroxyiso-propylcarbonate, tert-butylperoxy-3,3,5-trimethylhexanoate, tert-butyl peracetate, tert-butyl perbenzoate, butyl 4,4-di-tert-butylperoxyvalerate, 2,2-di-tert-butylperoxybutane, dicumyl peroxide, tert-butyl cumyl peroxide, 1,3-di-(tert-butylperoxyisopropyl)-benzene and di-tert-butyl peroxide. Other examples are organic hydroperoxides, such as diisopropylbenzene monohydroperoxide, cumyl hydroperoxide, tert-butyl hydroperoxide, p-menthyl hydroperoxide and pinane hydroperoxide, as well as 2,3-di-methyl-2,3-diphenylbutane, 3,4-dimethyl-3,4-diphenylhexane and 2,2,3,3-tetraphenylbutane.

The functionalization can be carried out in a known manner at from 240° to 360° C., preferably from 250° to 330° C., in the course of from 0.2 to 15, preferably from 1 to 10, minutes in suitable mixing and kneading units, such as twin-screw extruders.

In addition to these essential components, the novel molding materials may contain not more than 100, preferably from 5 to 30, parts by weight, based on 100 parts by weight of the sum of the components (A) and (B), of a nonfunctionalized polyphenylene ether (C). This has already been described under components b1), so that further explanations are unnecessary.

Moreover, the novel molding materials contain, as component (D), not more than 50, preferably from 5 to 20, parts by weight, based on 100 parts by weight of the sum of components (A) and (B), of a vinylaromatic polymer. Toughened polymers or block copolymers are preferred.

Suitable polymers are all known homo- and copolymers obtained from vinylaromatic monomers. Preferred polymers are derived from styrene and from styrenes which are alkyl-substituted in the nucleus or side chain. Preferred monomers from which the polymers are derived are styrene, p-methylstyrene and α-methylstyrene, in particular styrene. Not more than 10% by weight, based on the vinylaromatic monomer, of polar compounds, such as acrylonitrile, acrylic acid, (meth)acrylates of alcohols of 1 to 8 carbon atoms and/or maleic acid, may be used as comonomers.

It is also possible concomitantly to use nonpolar comonomers, such as butadiene, isoprene or pentadiene, which, together with the abovementioned vinylaromatic monomers, give random or block copolymers.

Examples are styrene/butadiene block copolymers, including AB, ABA and ABAB block copolymers, which may also be tapered, star block copolymers and the like, similar isoprene block copolymers and (partially) hydrogenated block copolymers. A is styrene and B is butadiene or isoprene. Such block copolymers are disclosed in, for example DE-A 2 255 930 and DE-A 24 434 848.

Examples of suitable styrene polymers are poly-styrene poly-p-methylstyrene, poly-α-methylstyrene, styrene/α-methylstyrenecopolymers,styrene/acrylonitrile copolymers, copolymers of styrene/methyl acrylate, styrene/butyl acrylate, styrene/methyl methacrylate, styrene/butadiene, styrene/maleic anhydride, styrene/ acrylonitrile/butadiene, copolymers of ethylvinylbenzene and divinylbenzene and acrylic resin-modified styrene/ butadiene polymers. Mixtures of homopolystyrene and the abovementioned copolymers are also suitable.

Other suitable vinylaromatic polymers are styrene polymers toughened with elastomeric polymers. As a rule, such high impact styrene polymers contain from 2 to 20% by weight of an elastomeric polymer. Preferred elastomeric polymers have a glass transition temperature (Tg) of $\leq 0°$ C.,in particular $\leq -20°$ C. Examples are thermoplastic rubbers, such as polybutadiene rubbers, polybutene rubbers, polyisoprene rubbers, acrylonitrile/butadiene rubbers, ethylene/propylene rubbers, polyester rubbers and ethylene rubbers, and elastomeric copolymers of ethylene and esters of (meth- )acrylic acid, e.g. ethylene/butyl acrylate copolymers. Other examples are ionomers, polyoctenylenes and the abovementioned styrene/butadiene and styrene/isoprene block copolymers.

The novel molding materials may furthermore contain known additives and processing assistants. These may be reinforcing agents and fillers, which are used in amounts of not more than 80, preferably from 20 to 60, parts by weight, based on 100 parts by weight of the sum of components (A) and (B).

Examples are reinforcing agents, such as glass fibers, asbestos fibers, carbon fibers or aromatic polyamide fibers, and fillers, such as gypsum fibers, synthetic calcium silicates, kaolin, calcined kaolin, wollastonite, talc and chalk. Combinations of these substances may also be used.

Materials for increasing shielding against electromagnetic waves (for example metal flakes, metal powder, metal fibers and metal-coated fillers), dyes, pigments, antistatic agents, antioxidants, flameproofing agents; heat stabilizers and UV stabilizers and lubricants and mold release agents, which are required for further processing of the molding materials, for example in the production of moldings, may also be mentioned.

Antioxidants and heat stabilizers which may be added to the thermoplastic materials according to the invention are, for example, halides of metals of Group I of the Periodic Table, for example sodium halides, potassium halides and lithium halides, if necessary in combination with copper(I) halides, for example chlorides, bromides or iodides. Sterically hindered amines or phenols, hydroquinones, substituted members of this group and mixtures thereof may also be used.

Examples of UV stabilizers are various substituted resorcinols, salicylates, benzotriazoles and benzophenones.

Lubricants and mold release agents are stearic acids, stearyl alcohol, alkyl stearates and stearamides and esters of pentaerythritol with long-chain fatty acids.

Examples of flameproofing agents are halogen-containing substances, such as 2,6,2',6'-tetrabromobisphenol, tetrabromophthalic acid and its derivatives, poly-2,6-dibromophenol, tribromophenol and its derivatives and chlorohydrocarbons, which may be used in combination with synergistic agents, such as antimony compounds, boron compounds or zinc compounds. Phosphorus-containing flameproofing agents as disclosed in German applications P 37 32 907.3 and P 38 31 992.6 may also be mentioned, for example red phosphorus, triphenyl phosphate, triphenyl phosphite and triphenylphosphine oxide.

Further conventional additives for molding materials of polyphenylene ether and polyamide are phase mediators. Such substances are disclosed in, for example, EP-A 24 120, EP-A 46 040, EP-A 164 767 and EP-A 182 163. They may be liquid diene polymers, which may have been reacted with maleic anhydride, or may be olefinically unsaturated carboxylic acids and their derivatives, such as maleic anhydride, maleic acid or fumaric acid, which may be copolymerized with styrene, or they may be oxidized polyolefins or silicon compounds.

The novel thermoplastic molding materials are advantageously obtained by mixing the individual components at from 250° to 380° C. in conventional mixing apparatuses, such as kneaders, Banbury mixers and single-screw extruders, but preferably in a twin-screw extruder. In order to obtain a very homogeneous molding material, thorough mixing is essential. In general, average mixing times of from 0.2 to 30 minutes are required for this purpose. The order in which the components are mixed with one another can be varied, for example 2 or, if required, 3 components can be premixed or all the components can be mixed together. Preferably, a1) and a2) are premixed at from 250° to 300° C. in the course of from 0.3 to 5 minutes, a2) advantageously being used as an aqueous dispersion. The water is removed by suitable measures, such as the use of reduced pressure. It may be advantageous to prepare the functionalized polyphenylene ether (B) in a first zone of an extruder and to mix it with the other components of the novel molding material in one or more downstream zones. Such a process is described in DE-A 37 02 582.

Moldings having advantageous properties can be produced from the novel thermoplastic molding materials by injection molding or extrusion. The novel molding materials have a balanced property profile. They possess good processibility, exhibit high total penetration energy in combination with ductile fracture and have high impact strength, which decreases only slightly on repeated compounding.

EXAMPLES AND COMPARATIVE EXPERIMENTS

The following components were used:
Component A:

a1 (1): Nylon 6, number average molecular weight $M_n = 18,000$ a1 (2): Nylon 6,6, $M_n = 22,000$ a2: An emulsion polymer was prepared by polymerizing 67.2 parts of a mixture of 99 parts of butadiene and 1 part of tert-dodecyl mercaptan in aqueous dispersion. Controlled agglomeration of the polybutadiene particles was then effected by adding a polymer dispersion of a copolymer of ethyl acrylate and methacrylamide (96:4) in water. The ratio of ethyl acrylate copolymer to polybutadiene/tert-dodecyl mercaptan polymer was 4:96. A monomer mixture of n-butyl acrylate, tert-butyl acrylate and methacrylic acid (93.4:6:0.6) was polymerized, as an outer shell, on the agglomerated polybutadiene dispersion. The ratio of core (polybutadiene/tertodecyl mercaptan) to outer shell was 7:3. The median particle diameter ($d_{50}$ value) determined by the ultracentrifuge method, was 0.5 μm. Parts and ratios are by weight.

A': A premix of a1 (2) and a2 was prepared in a ZSK 53 extruder from Werner & Pfleiderer. Component a1 (2) was introduced into the feed zone of the extruder, plasticized in a first screw zone and conveyed via a kneading zone into a second screw zone, into which the aqueous suspension of the elastomeric polymer was metered (50 parts by weight of polymer +50 parts by weight of water).

The thermoplastic and the rubber were mixed thoroughly with one another in the downstream extruder zones, the spontaneously vaporized water being removed as steam through devolatilization ports downstream of the kneading zone, and the melt then being extruded, cooled and comminuted. The process was carried out at 280° C. The mean residence time of the polyamide in the extruder was 2 minutes. The mass flow rates of a1 (2) and a2 were adjusted so that the components A, contained 75% by weight of a1 (2) and 25% by weight of a2.

A' (V): For comparison, an emulsion polymer having a hard outer shell was used.

a2 (V): 16 parts by weight of butyl acrylate and 0.4 part by weight of tricyclodecenyl acrylate in 150 parts by weight of water were heated to 60° C. while stirring, with the addition of one part by weight of the sodium salt of a $C_{12}$–$C_{18}$-paraffinsulfonic acid, 0.3 part by weight of potassium persulfate, 0.3 part by weight of sodium bicarbonate and 0.15 part by weight of sodium pyrophospate. 10 minutes after initiation of the polymerization reaction, a mixture of 82 parts by weight of butyl acrylate and 1.6 parts by weight of tricyclodecenyl acrylate were added in the course of 3 hours. After the end of the monomer addition, the reaction was allowed to continue for a further hour. The resulting latex of the crosslinked butyl acrylate polymer had a solids content of 40% by weight. The median particle size (weight average) was 96 nm.

150 parts by weight of the polybutyl acrylate latex thus obtained were mixed with 20 parts by weight of a mixture of styrene, methyl methacrylate and maleic anhydride (weight ratio 75:23:2) and 40 parts by weight of water, and the stirred mixture was heated at 65° C. for 4 hours after the addition of a further 0.03 part by weight of potassium persulfate and 0.05 part by weight of lauroyl peroxide. After the end of the polymerization, the polymer was processed with a1 (2), as described in A', to give the mixture A' (V) of 75% by weight of a1 (2) and 25% by weight of the polymer a2 (V).

Component B

B: 89% by weight of poly-(2,6-dimethyl-1,4-phenylene) ether having a relative viscosity of 0.55 dl/g (1% strength by weight in $CHCl_3$ at 25° C.) and 8.5% by weight of polystyrene (PS 144 C from BASF AG, melt flow index MFI at 200° C./5 kg load = 24 g/10 min), 2.45% by weight of fumaric acid and 0.05% by weight of 3,4-dimethyl-3,4-diphenylhexane were metered into a twin-screw extruder (ZSK 53 from Werner & Pfleiderer), melted in a first zone with the use of kneading elements at 255° C., reacted in a second zone with kneading and with the use of kneading elements at 265° C. and then devolatilized in a devolatilization zone at 255° C. by using reduced pressure. The mean residence time in the extruder was 2.5 min.

Component C

C: Poly-(2,6-dimethyl-1,4-phenylene) ether having a relative viscosity of 0.55 dl/g (1% strength by weight in $CHCl_3$ at 25° C.).

Component D

D (1): Styrene/butadiene/styrene three-block copolymer having a styrene content of 30% by weight (Cariflex® TR 1102 from Shell);

D (2): Two-block copolymer of styrene and hydrogenated polybutadiene block, having a styrene content of 35% by weight and an $M_w$ of 95,000

For the production of moldings, the components according to Table 1 were mixed in a twin-screw extruder having a screw diameter of 40 mm at a barrel temperature of 280° C. The extrudate was passed through a water bath and granulated. The dried granules were injection molded at 280° C. to give standard small bars.

TABLE 1

Starting materials for the preparation of molding materials

| Examples | Comp. Experiments | Type | A Amount | B Amount | C Amount | Type | D Amount |
|---|---|---|---|---|---|---|---|
| 1 | | A' | 24 | 37 | | D (2) | 14)* |
| | | a1 (2) | 20 | | | | |
| 2 | | A' | 26 | 33 | 5 | D (1) | 10 |
| | | a1 (1) | 26 | | | | |
| | 2* | A' (V) | 26 | 33 | 5 | D (1) | 10 |
| | | a1 (1) | 26 | | | | |
| 3 | | A' | 18 | 44 | | D (1) | 12 |
| | | a1 (2) | 26 | | | | |
| | 3* | A' | 18 | | 44 | D (1) | 12 |
| | | a1 (2) | 26 | | | | |

)*In Example 1, 5 parts by weight of Polystyrol 144 (from BASF AG) were mixed with components A, B and D (2).

The amounts, stated in Table 2, of the components which are present in the molding materials of Examples 1 to 3 are calculated from the data of Table 1. Comparative Experiment 2* differs from Example 2 only in that, instead of the emulsion polymer a2, the emulsion polymer a2 (V) having a hard outer shell is used. In Comparative Experiment 3*, on contrast to Example 3, no functionalized polyphenylene ether B was used but instead a non-functionalized polyphenylene ether C.

TABLE 2

Position of the molding materials of Examples 1 to 3

| | Component A | | | Component B | Component C | Component D | |
|---|---|---|---|---|---|---|---|
| | Components | | | | | | |
| Example | Type | Amount [%, based on A] | Amount [%, based on A + B] | Amount [%, based on A + B] | Amount in parts by wt.)** | Type | Amount in parts by wt.)** |
| 1 | a1 (2) | 86.4) | 54.3 | 45.7 | | D (2) | 17.3)* |
| | a2 | 13.6) | | | | | |
| | a1 (1) | 50.0) | | | | | |
| 2 | a1 (2) | 37.5) | 61.2 | 38.8 | 5.9 | D (1) | 11.8 |
| | a2 | 12.5) | | | | | |
| 3 | a1 (s) | 89.8) | 50.0 | 50.0 | | D (1) | 13.6 |

TABLE 2-continued

| | Position of the molding materials of Examples 1 to 3 | | | | | |
|---|---|---|---|---|---|---|
| | Component A | | Component B | Component C | Component D | |
| | Components | | | | | |
| Example | Type | Amount [%, based on A] | Amount [%, based on A + B] | Amount [%, based on A + B] | Amount in parts by wt.)** | Type | Amount in parts by wt.)** |
| | a2 | 10.2) | | | | | |

)*The molding material of Example 1 additionally contains 6.2 parts by weight of Polystyrol 144 (from BASF AG)
)**Based in each case on 100 parts by weight of the sum of components A and B The notched impact strength according to DIN 54,435, the total penetration energy according to DIN 53,435 and the melt flow index according to DIN 53,735 at 280° C./10 kg were determined.

The fractured specimens were examined visually to determine whether a ductile fracture was present.

The decrease in the notched impact strength was calculated using the following equation:

$$\Delta a_{KL} = \frac{a_{KL}(1) - a_{KL}(2)}{a_{KL}(1)} \cdot 100[\%]$$

$a_{KL}(1)$ is the notched impact strength measured according to DIN 53,753, using standard small bars (1) injection molded at 280° C. $a_{KL}(2)$ is the same parameter determined using standard small bars (2) which were produced by injection molding milled standard small bars (1). The results of the measurements are summarized in Table 3.

TABLE 3

| | | Properties of the molding materials | | | | |
|---|---|---|---|---|---|---|
| Example | Comparative Experiment | Notched impact strength $a_K$ [kJ/m²] | Total penetration energy $W_{tot}$ [Nm] | Melt flow index MFI [g/10 min] | Ductile fracture | Decrease in impact strength after repeated compounding $\Delta a_{KL}$ [%] |
| 1 | | 48 | 60 | 60 | Yes | |
| 2 | | 53 | 60 | 68 | Yes | |
| | 2* | 39 | 5 | 53 | No | |
| 3 | | | | 74 | | 63 |
| | 3* | | | 45 | | 92 |

We claim:

1. A thermoplastic molding material which is free of cyanuric acid or cyanuric acid derivatives and contains, as essential components,
   (A) from 5 to 95% by weight of a toughened polyamide of
      a1) from 70 to 98% by weight, based on (A), of a polyamide and
      a2) from 2 to 30% by weight, based on (A), of an emulsion polymer whose particles outer shell, have a Tg $\leq 20°$ C. and
   (B) from 5 to 95% by weight of a functionalized poly-phenylene ether.

2. A molding material as claimed in claim 1, wherein a2) is an emulsion polymer whose particles consist of a core and one or more shells, wherein the core and the outer shell do not have a glass transition temperature higher than 0° C.

3. A molding material as claimed in claim 1, wherein the emulsion polymer a2) has one or more reactive groups in the outer shell.

4. A molding material as claimed in claim 3, wherein the reactive group in the emulsion polymer is introduced by polymerization of a functionalized monomer which contains a carboxyl, carboxylic ester, carboxamide, carboximide, anhydride, latent carboxyl, epoxy, urea, amino or urethane group.

5. A molding material as claimed in claim 1, wherein the functionalized polyphenylene ether (B) has been prepared by reacting
   b1) from 70 to 99.9% by weight of polyphenylene ether,
   b2) from 0 to 20% by weight of a vinylaromatic polymer,
   b3) from 0.1 to 30% by weight of an ethylenically unsaturated compound having one or more epoxy, amino, carboxyl, carboxylic anhydride, carboxylic ester, carboxamide or carboximide groups and
   b4) from 0 to 5% by weight of a free radical initiator, the percentages by weight being based on the sum of b1) to b4), in the course of from 0.2 to 15 minutes at from 240° to 360° C.

* * * * *